April 28, 1936.  G. J. ZIEGLER  2,038,818
INTERNAL COMBUSTION ENGINE
Filed Jan. 30, 1934   3 Sheets—Sheet 3
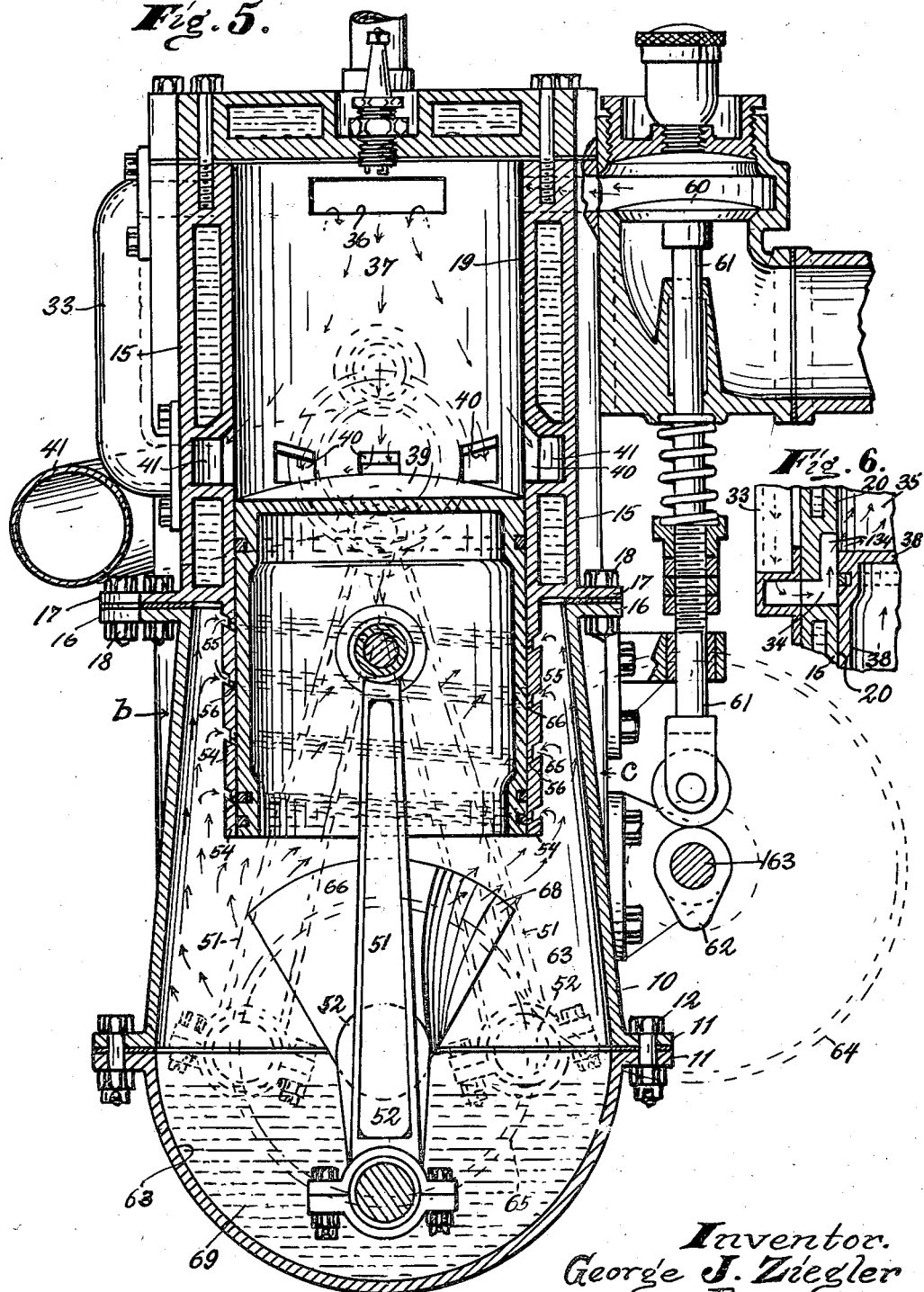

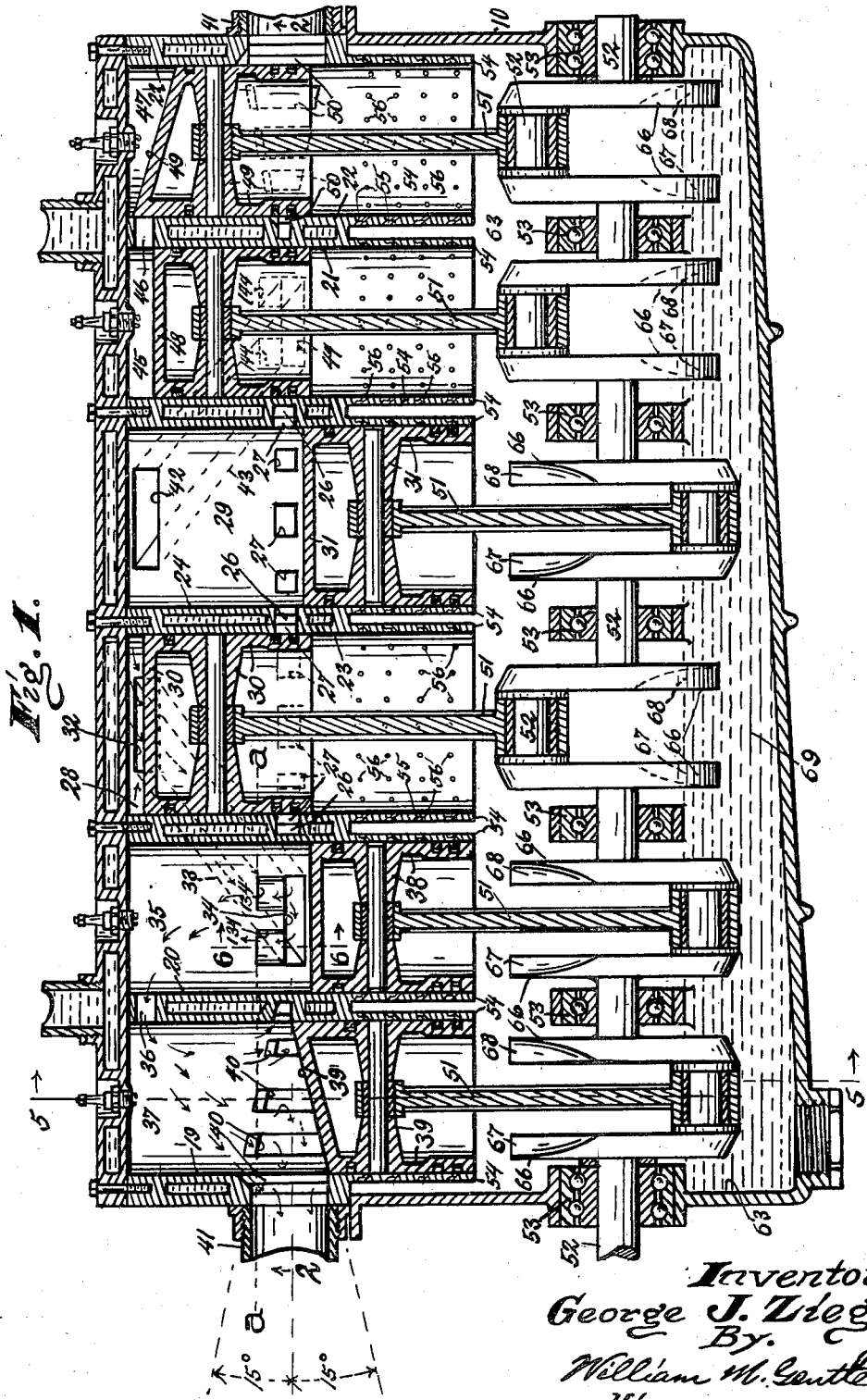

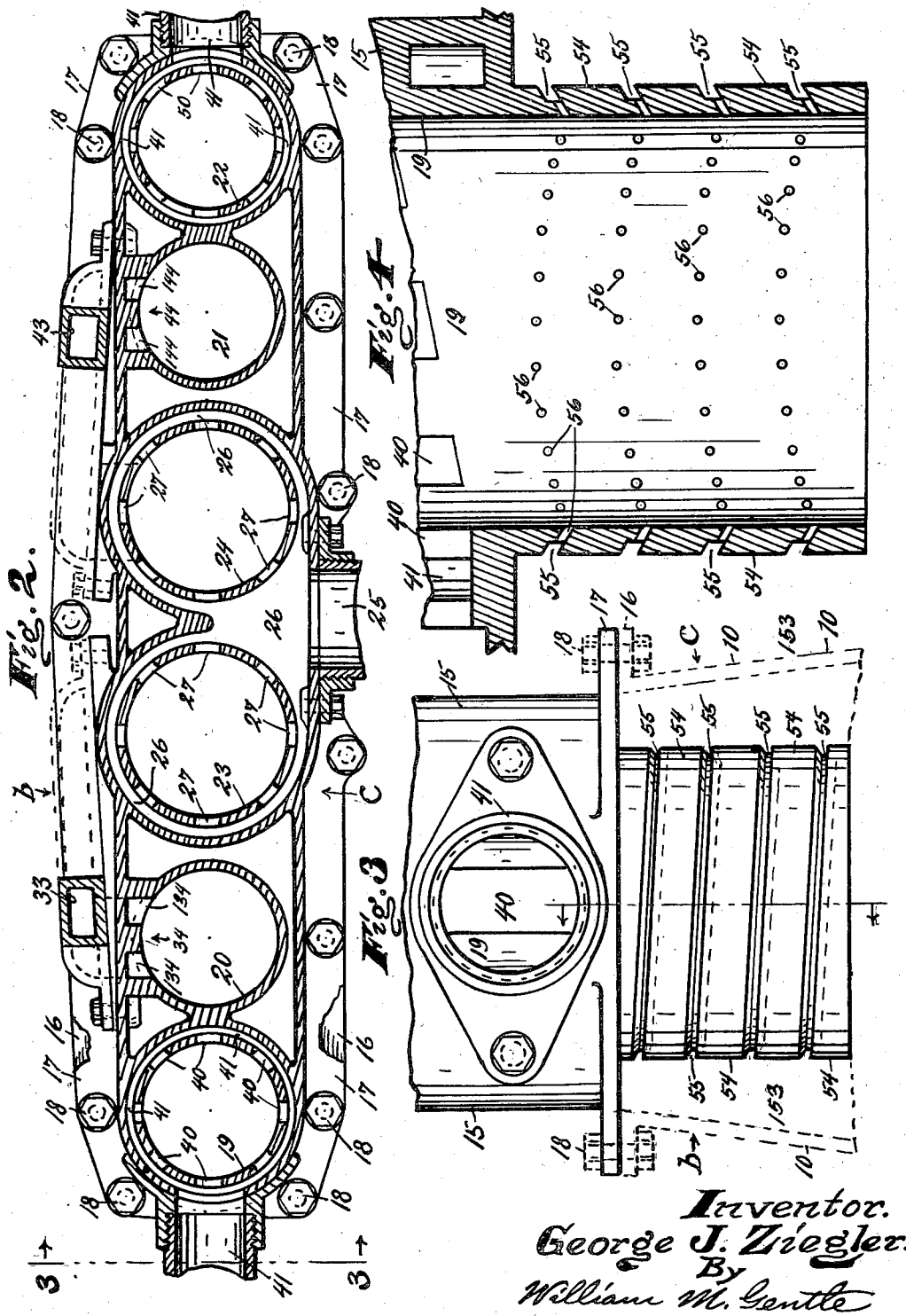

Patented Apr. 28, 1936

2,038,818

UNITED STATES PATENT OFFICE 2,038,818

INTERNAL COMBUSTION ENGINE

George J. Ziegler, Los Angeles, Calif., assignor of one-half to Charles J. Heyler, Los Angeles, Calif.

Application January 30, 1934, Serial No. 708,991

4 Claims. (Cl. 123—53)

This invention relates to an internal combustion engine, and the principal object is to improve the means for charging its cylinders with fuel mixtures, exhausting the burned gases from the cylinders after the fuel mixtures have been burned, and lubricating the cylinder walls during the periods of operation to accomplish an increased engine efficiency. To that end I construct the engine so that the charges of fuel mixtures are subjected to a relatively high pressure prior to injecting them into the combustion chambers, whereby a more thorough mixing and combustion of the fuel and air is accomplished to thereby increase engine operation efficiency, and also this high pressure of the fuel mixture aids greatly in thoroughly exhausting the burned gases from the cylinders to make room for more of the fuel and thereby increase the power and also cause a more uniform operation of the engine. Also in the foregoing connection I provide means for exhausting the burned gases from the cylinders by enlarging the exhaust ports so that when fully opened the exhaust gases under the influence of the incoming charges of fuel can pass freely from the cylinders. Also the top surfaces of the pistons in the burned gas discharge cylinders are inclined so they direct the burned gases toward the largest and first opened of the exhaust ports. Also in order to increase the engine efficiency I provide means for lubricating the engine cylinders so that combustion of the fuel mixture will not easily burn the fine and evenly spread lubricant into a carbon scale such as will prevent a smooth and non-wearing contact of the pistons with the cylinder walls.

In other words, the lubricant is applied to the cylinder walls in such an even fine spread that while it will easily prevent excessive friction, it will not burn into a carbon that will adhere to the cylinder walls, but when burned will pass out of the cylinders with the exhaust gases. Therefore, an object of this invention is to provide a simple means of lubricating the cylinder walls and keeping them clean of carbon.

To that end I provide means for passing a lubricant through and around the walls of the cylinders into contact with the pistons, whereby it is spread in a relatively fine even coat over the cylinder walls to prevent frictional wear between these parts.

A feature of invention is shown in the means I employ for throwing the lubricant in the engine crank case up into the inclined channels that extend around the skirts of the cylinders, and also in my arrangement of the inclined and spaced oil ducts that I extend from the channels into the inner wall of the cylinder to thereby effect a relatively even spread of lubrication entirely around the pistons.

Other objects, advantages and features of invention may appear from the accompanying drawings, the subjoined detailed description and the appended claims.

The accompanying drawings illustrate my invention, in which:

Figure 1 is a central longitudinal section through the engine showing inlet ports through the walls of the charging cylinders through which fuel mixture under pressure is supplied to these cylinders; and also showing a detailed construction of the main parts of the engine.

Fig. 2 is a cross section on the line 2—2, Fig. 1, showing the means for supplying fuel mixture to the charging cylinders and also the means for exhausting the burned gases from the end combustion chambers.

Fig. 3 is an enlarged fragmental sectional view on line 3—3, Fig. 2, showing a perspective view of the inclined lubricating channels in one of the cylinder skirts.

Fig. 4 is an enlarged fragmental section on line 4—4, Fig. 3, showing the detailed construction of the lubricating channels in the cylinder skirts and the spaced inclined ducts that lead from the channels to the inside surface of the cylinder rollers.

Fig. 5 is an enlarged vertical section on line 5—5, Fig. 1, showing the detailed construction of one of the cylinders and associated parts; and also showing by full and dotted lines that the charging cylinders can be supplied with a fuel mixture through a timed operated inlet valve that can be connected with a carbureter not shown.

Fig. 6 is an enlarged fragmental section on line 6—6 of Fig. 1 showing by-passes connected to an inlet port to increase the intake fuel period of engine cycle.

The engine includes a split crank shaft housing 10 having flanges 11 secured together by bolts 12, and secured in bearings 13 is a crank shaft 14.

The upper end of the top part of the housing 10 is flanged to form a seat for the bottom of the cylinder housing 15 with the flanges 16 and 17 secured together by bolts 18.

The housing 15 is preferably formed in one piece and includes all six cylinders, inlet and exhaust ports thereto, and water jacket thereof; and while I prefer to show only six cylinders it is understood that there can be more or less.

The cylinders are arranged so that a pair of combustion cylinders 19 and 20 are at one end of the engine and another pair of combustion cylinders 21 and 22 are at the other end thereof with their respective charging cylinders 23 and 24 arranged between them.

The charging cylinders 23 and 24 are supplied with a fuel mixture through the inlet 25, chamber 26 and ports 27 from a source of supply not shown; it being assumed that the mixture is under pressure so that chamber 28 of cylinder 23 and chamber 29 of cylinder 24 will be charged with mixture when the respective pistons 30 and 31 are moved to uncover the ports 27.

The chamber 28 has a discharge outlet 32 in its upper end that is connected by a by-pass 33 with the inlet port 34 adjacent the bottom end of the chamber 35 of the cylinder 20, and the chamber 35 is connected by a by-pass 36 with a chamber 37 in the cylinder 21. By this connection charges of fuel mixture can pass from the chamber 28 to fill the chambers 35 and 37 with charges of fuel mixture in a prearranged order. That is, when the piston 38 uncovers the inlet port 34 and the piston 39 uncovers the discharge outlets 40 in the bottom end of chambers 37 fuel mixture from the source heretofore mentioned will charge the chambers 35 and 37, and these charges will be compressed by the pistons 38 and 39 when they are moved on their compression stroke.

The top surface of the piston 39 is inclined about fifteen degrees to deflect the burned gases from combustion chambers 35, 37 toward the outer and largest exhaust port 40 that is arranged to open directly into the exhaust pipe 41 and from this port the other exhaust ports 40 around the cylinder decrease in size at their top and bottom edges at a ratio of fifteen degrees so they are opened and closed in a successive order. That is, the ports 40 nearest to the exhaust pipe 41 are opened first and closed last; and also the largest exhaust ports 40 are opened prior to the opening of the inlet port 34 in combustion chamber 35 so the burned gases in the chambers 35 and 37 are free to start on their exhaust course as soon as the new charge of mixture enters the chamber 35.

The chamber 29 has a discharge outlet 42 that is connected by a by-pass 43 with an inlet 44 adjacent the bottom end of the combustion chamber 45 in cylinder 22; and chamber 45 is connected by a by-pass 46 with the combustion chamber 47 in the cylinder, and pistons 48 and 49 are arranged in these cylinders.

The piston 49 and the exhaust ports 50 from chamber 47 are constructed in the same way as piston 39 and ports 40 except that they are oppositely arranged and inclined.

The pistons are connected by piston rods 51 with the crank shaft 52 that is mounted in bearings 53.

The pistons 38, 39 and 48, 49 are arranged to operate in pairs that coact with one another in charging and exhausting the cylinders. That is, when the pair of pistons 38, 39 are on their combustion stroke they move the pistons 48, 49 to compress charges of fuel mixture in the pair of combustion chambers 45, 47; and also move the piston 31 to intake another supply of fuel mixture for recharging the chambers 45, 47. Also this combustion stroke of pistons 38, 39 moves the piston 30 to compress a supply of fuel mixture for recharging the chambers 35, 37 as soon as the ports 34 and 40 are open.

When the pistons 48 and 49 are on their combustion stroke the operation above described is reversed in order. That is, the pair of pistons 38, 39 apply power to the crank shaft 52 in one-half of its cycle and 48 and 49 apply power to it in the other half.

Preferably the ports 34 and 44 are provided with extensions 134 and 144 in the cylinder walls that are arranged to prolong the intake of fuel mixture into the pairs of cylinders; and also the exhaust ports 40 and 50 have their top walls beveled off to enlarge those ports and thereby prolong the exhaust periods.

All of the cylinders are extended downwardly into the crank case chamber 63 to form skirts 54 in which the spaced and inclined lubricating channels 55 are arranged and preferably these channels are inclined from the back side b downwardly toward the front side c of the crank case, and each channel extends entirely around its respective skirt; and each channel has its spaced perforations 56 through which lubricant can reach the inside walls of the cylinders.

The crank shaft 52 is provided with counterbalance wings 66 that are arranged in pairs each reversely cut away to form deflectors 67 and 68 that in passing through the oil 69 in the crank case throw it up around the rear portion of each skirt 54 so it will enter the channels 55.

The channels are inclined so that the lubricant will flow entirely around the skirts and in passing through the perforations 56 will lubricate the pistons as much in one place as in another, and by this means a relatively fine coat of lubricant is spread entirely around each piston to lubricate its respective cylinder.

As best shown in Figs. 1 and 2, the engine can be supplied with a fuel mixture under pressure through the pipe 25, or if desired the fuel mixture can be supplied to the engine from a carbureter not shown. When so constructed, the engine is supplied with an inlet valve 60 for each of the cylinders 23 and 24, as indicated in Fig. 5. These valves are operated by the usual cam push-rods 61, cams 62, cam shaft 163 and timing gears 64 and 65 that are driven by the crank shaft 52.

As these valves and associated parts are old and well known only one of them is shown in detail.

My engine is operated as herein fully shown and described and for the sake of brevity is not herein repeated.

I claim as my invention:

1. An internal combustion engine including a housing having a pair of integral cylinders therein that are connected by a by-pass at their combustion ends and also having an inlet port through the wall of one of said cylinders through which both can be charged with a fuel mixture under pressure, said port having extensions thereto arranged to prolong the fuel intake period of engine cycle, and exhaust ports through the wall of said other cylinder through which the burned gases of both cylinders can be exhausted, said exhaust ports tapered upwardly and outwardly and enlarged relative to one another and arranged to be opened slightly before the inlet ports are opened so that the burned gases of both cylinders can be effectively exhausted by the intake of fuel mixture under pressure, and pistons for opening and closing said ports, one of said pistons having an inclined top surface arranged to aid in opening and closing said exhaust ports successively and to deflect the burned gases toward the largest of said exhaust ports.

2. An internal combustion engine including a housing having a pair of integral cylinders therein that are connected by a by-pass at their combustion ends and having an inlet port through the wall of one of said cylinders through which both are charged with a fuel mixture under pressure said inlet port having extensions thereto arranged to prolong the intake of fuel into said cylinders, a charging cylinder for forcing said mixture into said cylinders when the inlet port is open, said other cylinder of said pair having exhaust ports through the walls thereof that are tapered and enlarged relative to one another through which the burned gases in said pair of cylinders can exhaust when the exhaust ports are open, and pistons in said pair of cylinders for opening and closing the inlet and exhaust ports, one of said pistons having a top surface inclined to aid in opening and closing said exhaust ports successively and to deflect the burned gases toward the largest of said exhaust ports.

3. In an internal combustion engine the combination with a housing having a pair of cylinders connected by a passage at their combustion ends and having an inlet port through the wall of one of said cylinders through which both can be charged with a fuel mixture, a charging cylinder connected to said pair of cylinders for charging and recharging them when the inlet port is open, a by-pass connecting said charging cylinder with the inlet port, pistons in said cylinders, a crank shaft, and piston rods connecting said shaft and pistons whereby charges of mixture can be driven from said charging cylinder to charge and recharge said pair of cylinders when the inlet port is open, an exhaust manifold and exhaust ports through the wall of one of said cylinders through which the burned gases of both cylinders can be exhausted, said exhaust ports arranged around the exhaust cylinder with the outer and larger one opening directly into said exhaust manifold and the others decreasing in size at their top and bottom edges at a ratio of fifteen degrees, of skirts to said cylinders having lubricating channels in the outer wall thereof and perforations that connect said channels with the inner surfaces of said cylinders, and means connected with said crank shaft for splashing lubricant into the channels of said skirts.

4. In an internal combustion engine the combination with a pair of cylinders connected by a passage at their combustion ends and having an inlet port through the wall of one of said cylinders through which both can be charged with a combustible mixture, a charging cylinder integral with said pairs of cylinders for charging and recharging them when the inlet port is open, a by-pass connecting the discharge end of said charging cylinder with the inlet port, pistons in all of said cylinders, a crank case, a crank shaft, piston rods connecting said pistons and shafts whereby charges of mixture can be driven from said charging cylinder to charge and recharge said pair of cylinders, an exhaust manifold, exhaust ports through the wall of one of said pair of cylinders through which both cylinders can exhaust, said exhaust ports arranged around the exhaust cylinder with the outer and larger one opening directly into said exhaust manifold and the others decreasing in size at their top and bottom edges at a ratio of fifteen degrees, of skirts integral with said cylinders that extend down into said crank case, spaced lubricating channels in the outer walls of said skirts that are inclined downwardly and around said skirts with spaced perforations connecting said channels with the inner surfaces of said cylinders, and counter-balance wings on said crank shaft for splashing lubricant into said channels to thereby lubricate said cylinders and the pistons therein.

GEORGE J. ZIEGLER.